Nov. 18, 1969 R. COHEN ET AL 3,479,647

DATA PROCESS SYSTEM INCLUDING MEANS RESPONSIVE TO PREDETERMINED CODES FOR PROVIDING SUBSYSTEM COMMUNICATION

Filed June 3, 1966

INVENTORS
ROBERT COHEN
JOHN F. COULEUR
RICHARD L. RUTH

BY Arnold E. Renner
William C. Cahill
Ronald W. O'Keefe
ATTORNEYS

United States Patent Office 3,479,647

Patented Nov. 18, 1969

3,479,647

DATA PROCESS SYSTEM INCLUDING MEANS RESPONSIVE TO PREDETERMINED CODES FOR PROVIDING SUBSYSTEM COMMUNICATION

Robert Cohen, John F. Couleur, and Richard L. Ruth, Phoenix, Ariz., assignors to General Electric Company, a corporation of New York Filed June 3, 1966, Ser. No. 555,166
Int. Cl. G11b *13/00*
U.S. Cl. 340—172.5 5 Claims

ABSTRACT OF THE DISCLOSURE

A data processing system including a data processor for directing a code and an address to a memory controller. The memory controller is connected to a memory device and is responsive to the code received from the data processor for providing the address to memory. The data retrieved at this address from memory is received by the memory controller, which includes means responsive to this data for selecting one of a plurality of communicating devices connected thereto. A signal is provided to the selected communicating device which generates a second address and executes the instruction located at that address.

The present invention pertains to data processing systems, and more specifically, to those systems utilizing control means for controlling communication among the subsystems of the data processing system.

A data processing system includes a data processor for manipulating data in accordance with the instructions of a program. The processor will receive an instruction, decode the instruction, and perform the operation indicated thereby. The operation is performed upon data received by the processor and temporarily stored thereby during the operation. The series of instructions are called a program and include decodable operations to be performed by the processor. The instructions of the program are obtained sequentially by the processor and, together with the data to be operated upon, are stored in memory devices.

The memory device may form any of several well-known types; however, most commonly, the main memory is a random access coincident current type having discrete addressable locations each of which provides storage for a word. The word may form data or instructions and may contain specific fields useful in a variety of operations. Normally, when the processor is in need of data or instructions it will generate a memory cycle and provide an address to the memory. The data or word stored at the address location will subsequently be retrieved and provided to the data processor.

A series of instructions comprising a program are usually "loaded" into the memory at the beginning of operation and thus occupies a "block" of memory which normally must not be disturbed until the program has been completed. Data to be operated upon by the processor in accordance with the instructions of the stored program is stored in other areas of memory and is retrieved and replaced in accordance with the decoded instructions.

Communication with the data processing system usually takes place through the media of input/output devices including such apparatus as magnetic tape handlers, paper tape readers, punch card readers, remote terminal devices (for time sharing and real time applications specific terminal devices may be designed to gain access to the data processing system). To control the receipt of information from input/output devices and to coordinate the transfer of information to and from such devices, an input/output control means is required. Thus, an input/output controller is provided and connects the data processing system to the variety of input/output devices. The input/output controller coordinates the information flow to and from the various input/output devices and also awards priority when more than one input/output device is attempting to communicate with the data processing system. Since input/output devices are usually electromechanical in nature and necessarily having much lower operating speed than the remainder of the data processing system, the input/output controller provides buffering to enable the processing system to proceed at its normal rate without waiting for the time consuming communication with the input/output device.

The data processing system thus described includes a processor, a memory, an input/output controller, and input/output devices. In many applications it may be found to be advantageous to utilize more than one processor and under most circumstances more than one block of memory may be used. Further, in those system configurations requiring a large number of input/output devices, a number of input/output controllers may be used each controlling a plurality of input/output devices.

To provide flexibility and also to coordinate the communication among the processor, memory device, an input/output controller, a memory controller may be utilized. A memory controller is the sole means of communication among the subsystems of the data processing systems and receives requests for access to memory as well as specific requests for communication to other subsystems. The memory controller provides a means for coordinating the execution of operations and transfers of information among the subsystems and may also provide a means for awarding priority when accesses to memory are requested by more than one subsystem.

To provide for intersubsystem communication, each subsystem of the present invention may include means for generating a predetermined code for application to the memory controller. This code is accompanied by an address and, when received by the memory controller, is decoded and utilized to retrieve information stored at the address. The information thus retrieved includes a second code interpreted by the memory controller for selecting a particular subsystem connected thereto. The selected subsystem is then provided with a signal generated by the memory controller to indicate that another subsystem connected to the memory controller desires to communicate with the signalled subsystem. Since the second code is stored in memory and is accessible by any subsystem connected to the memory controller, it is possible for a subsystem, for example a data processor, to access and alter the second code thereby directing requests for communication to an alternate subsystem. It may therefore be seen that the intercommunication of the subsystem connected to a memory controller may be controlled by a subsystem such as a data processor operating on an executive program to control the transfer of information throughout the system. In multiple data processing configurations, the ability to access and change the second code stored in memory permits the executive program to control the operation and execution of independent and simultaneously executed programs. The flexibility of the system and the speed with which a system may manipulate and transfer information is thus substantially enhanced through the utilization of predetermined codes received and interpreted by the memory controller.

It is therefore an object of the present invention to provide a data processing system including a memory controller responsive to predetermined codes to facilitate intersubsystem communication.

It is another object of the present invention to provide a data processing system utilizing a predetermined code to access memory and obtain the identification of a subsystem.

It is still another object of the present invention to provide a data processing system utilizing a predetermined code for gaining access to a second code for the transfer of information among subsystems.

It is a further object of the present invention to provide a data processing system wherein intersubsystem communication may readily be controlled through the expediency of changing the contents of a storage location in memory.

It is still another object of the present invention to provide a data processing system including a memory controller wherein a predetermined code is recognized by the latter to generate a signal to be forwarded to a subsystem to indicate the desire of another subsystem for communciation therewith.

These and other objects of the present invention will become apparent to those skilled in the art as the description proceeds.

Certain portions of the apparatus herein disclosed are not of our invention, but are the inventions of: David L. Bahrs, John F. Couleur, Richard L. Ruth, and William A. Shelly, as defined by the claims of their application, Ser. No. 555,491, filed June 6, 1966; David L. Bahrs, John F. Couleur, Richard L. Ruth, and William A. Shelly, as defined by the claims of their application, Ser. No. 558,515 filed June 17, 1966; Harry N. Cantrell and John F. Couleur, as defined by the claims of their application, Ser. No. 563,519, filed July 7, 1966; Robert Cohen, John F. Couleur, and Richard L. Ruth, as defined by the claims of their application, Ser. No. 563,521, filed July 7, 1966; Robert Cohen, John F. Couleur, and William A. Shelly, as defined by the claims of their application, Ser. No. 563,522, filed July 7, 1966; Robert Cohen, William A. Shelly, and Samuel M. Vidulich, as defined by the claims of their application, Ser. No. 567,-221, filed July 22, 1966; David L. Bahrs, and John F. Couleur, as defined by the claims of their application, Ser. No. 567,222, filed July 22, 1966; John F. Couleur and Richard L. Ruth, as defined by the claims of their application, Ser. No. 569,750, filed Aug. 2, 1966; John F. Couleur, Philip F. Gudenschwager, Richard L. Ruth, William A. Shelly, and Leonard G. Trubisky, as defined by the claims of their application, Ser. No. 577,376, filed Sept. 6, 1966; John F. Couleur, as defined by the claims of his application, Ser. No. 581,467, filed Sept. 23, 1966; and John F. Couleur, Richard L. Ruth, and William A. Shelly, as defined by the claims of their application, Ser. No. 584,801, filed Oct. 6, 1966; all such applications being assigned to the assignee of the present application.

DESCRIPTION OF FIGURES

The present invention may more readily be described by reference to the accompanying drawings in which.

Figure 1:
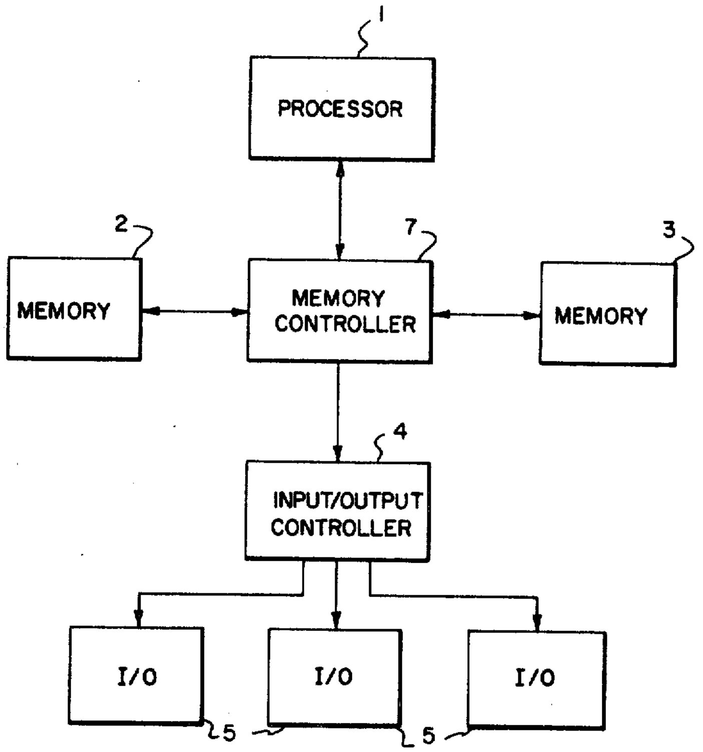
FIGURE 1 is a block diagram of a data processing system in a single memory controller configuration.

For a complete description of the system of FIGURE 1 and of my invention, reference is made to United States Patent No. 3,413,613 issued to David L. Bahrs, John F. Couleur, Richard L. Ruth, and William A. Shelly, on Nov. 26, 1968, and assigned to the assignee of the present invention. More particularly, attention is directed to FIGURES 2–120 and to the specification beginning at column 4, line 32, and ending at column 121, line 42, inclusive, of United States Patent No. 3,413,613 which are incorporated herein by reference and made a part hereof as if fully set forth herein.

What is claimed is:

1. In a data processing system the combination comprising: a plurality of communicating devices comprising at least two data processors for manipulating data in accordance with the instructions of a program and for generating a predetermined code and address and at least one input/output controller; a memory device for storing data and instructions at discrete addresses; a memory controller connected to all of said communicating devices and to said memory device, said memory controller responsive to said predetermined code from said processor for directing said predetermined address to said memory device and retrieving the data stored at said address, said retrieved data comprising a representation of one of said communicating devices; said memory controller including transmission means coupled to all of said communicating devices and controllable to transmit a notification signal to a selected one of said communicating devices, and control means responsive to said representation for controlling said transmission means to transmit a notification signal to the corresponding communicating device.

2. In a data processing system the combination comprising: at least two data processors for manipulating data in accordance with the instructions of a program and for generating a code and address, at least one input/output controller for controlling communication with peripheral devices; a memory device for storing data and instructions at discrete addresses; a memory controller connected to all of said data processors, input/output controllers and memory device, said memory controller responsive to said code from any connected data processor for directing said address to said memory device and retrieving the data stored at said address, said retrieved data comprising a representation of one of said data processors and input/output controllers; said memory controller including transmission means coupled to all of said data processors and input/output controllers and controllable to transmit a notification signal to a selected one of said data processors and input/output controllers, and control means responsive to said representation for controlling said transmission means to transmit a notification signal to the corresponding one of said data processors and input/output controllers.

3. In a data processing system the combination comprising: a plurality of communicating devices comprising at least two data processors for manipulating data in accordance with the instructions of a program and for generating a predetermined code and address and an input/output controller; a memory device for storing data words and instructions at discrete addresses; a memory controller connected to all of said communicating devices and to said memory device, said memory controller responsive to said predetermined code from said processor for directing said predetermined address to said memory device and retrieving the data word stored at said address, said retrieved data word comprising a representation of one of said communicating devices; said memory controller including transmission means coupled to all of said communicating devices and controllable to transmit a data word to a selected one of said communicating devices, and control means responsive to said code and to said representation for controlling said transmission means to transmit said data word to the corresponding communicating device.

4. The data processing system of claim 1 wherein each of said communicating devices comprises means for responding to a notification signal received thereby for generating a second predetermined code and address for retrieving an instruction stored at said second address, and means for executing said instruction.

5. The data processing system of claim 2 wherein each of said data processors and input/output controllers comprises means for responding to a notification signal received thereby for generating a second code and address for retrieving an instruction stored at said second address, and means for executing said instruction.

References Cited

UNITED STATES PATENTS

| | | | |
|---|---|---|---|
| 3,029,414 | 4/1962 | Schrimpf | 340—172.5 |
| 3,061,192 | 10/1962 | Terzian | 235—157 |
| 3,200,380 | 8/1965 | MacDonald | 340—172.5 |
| 3,222,649 | 12/1965 | King | 340—172.5 |
| 3,063,036 | 11/1962 | Reach et al. | 340—172.5 |
| 3,369,221 | 2/1968 | Lethin | 340—172.5 |

JOHN P. VANDENBURG, Primary Examiner